June 25, 1957 C. HILL 2,796,942
FOUR WHEEL DRIVE FOR AUTOMOTIVE VEHICLES
Filed Aug. 16, 1955 3 Sheets-Sheet 1

INVENTOR.
Claude Hill
BY
Carlson, Pitzner, Hubbard & Wolfe
Attys.

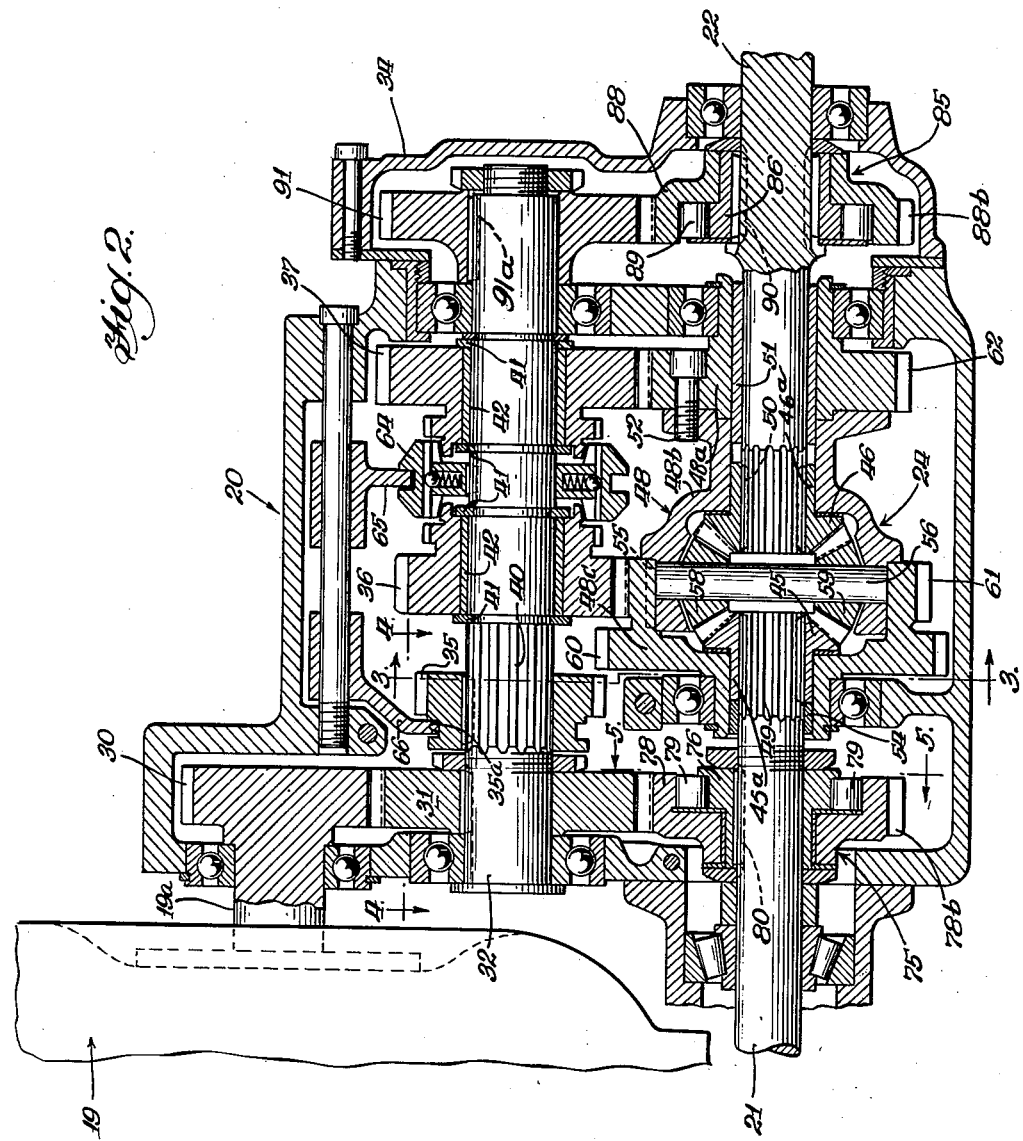

June 25, 1957   C. HILL   2,796,942
FOUR WHEEL DRIVE FOR AUTOMOTIVE VEHICLES
Filed Aug. 16, 1955   3 Sheets-Sheet 3
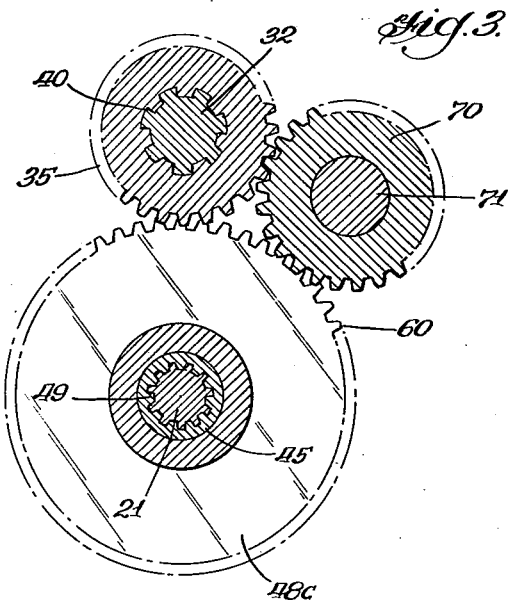
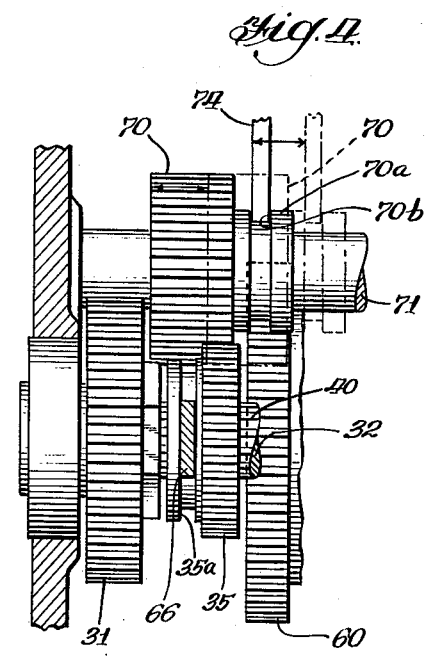
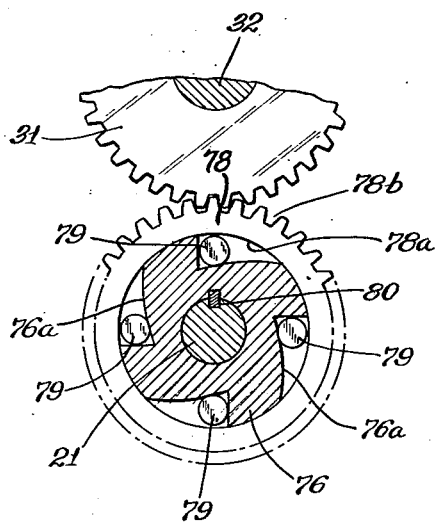
INVENTOR.
Claude Hill
BY
Carlson, Pitzner, Hubbard & Wolfe
Attys.

United States Patent Office 2,796,942
Patented June 25, 1957

2,796,942

FOUR WHEEL DRIVE FOR AUTOMOTIVE VEHICLES

Claude Hill, Kenilworth, England, assignor to Harry Ferguson Research Limited, Stow-on-the-Wold, England, a British company Application August 16, 1955, Serial No. 528,584

Claims priority, application Great Britain August 23, 1954

7 Claims. (Cl. 180—44)

The present invention relates to drives for powering multiple pairs of traction wheels from a prime mover in automotive vehicles. In subsequent reference to "four wheels" drives it is contemplated that the drive may extend also to six, eight, or more traction wheels. In any event, there is to be a minimum of two pairs or a total of four wheels.

It has been recognized that inasmuch as the tractive effort obtainable from a driven automobile wheel is proportional to its coefficient of friction with the ground and the weight on the wheel, maximum traction for a four wheel vehicle can, theoretically at least, best be obtained by supplying tractive effort to all four wheels. This concept underlies the employment of known four wheel drive systems in military vehicles or trucks intended for operation over unimproved terrain. However, certain prohibitive conditions and problems arise in the provision of known four wheel drive systems which have thus far precluded their employment in pneumatic-tired commercial and passenger vehicles. For example, if all four wheels are positively engaged by mechanisms driven from the engine, a severe amount of tire scraping or "cornering scrub" occurs as an incident to the execution of turns by the vehicle, for under such conditions the front wheels must run through arcs of greater radius than those of the rear wheels. In such a system, also, slight differences in effective wheel radii caused by inevitable differences in tire inflation, tread wear, or variations in loading, result in the occurrence of what is known as "circumferential scrub." Under such conditions the wheels having smaller radii necessarily tend to rotate faster than those having larger radii while traversing the same distance. If the wheels are positively driven together at the same angular speed by the drive system, then on corners the front wheels are bodily scraped over the ground surface; and on straight travel the rear wheels, if loaded or worn to have smaller radii, are bodily scraped over the ground surface. Tires will not long withstand such abuse. In addition, undue stresses or "wind up" occurs in the driving parts and fuel consumption is excessive.

The seriousness of cornering and circumferential scrub in producing tire wear and severe stresses on the drive system has resulted in prior vehicles being provided with manually operated clutch (or disengageable gear) arrangements enabling the front wheels of the vehicle to be selectively engaged or disengaged for positive drive effort. In these arrangements, it is intended that the front wheels be driven in a four wheel drive arrangement, and with acceptance of tire scrub, only when the surface conditions do not permit operation of the vehicle with two wheel drive. The advantages of maximum tractive effort and smooth power application to all four wheels obviously cannot be realized with such a stop-gap, part time arrangement.

As another partial expedient in overcoming these undesirable effects of cornering and circumferential scrub, it has also heretofore been proposed that three differentials be employed in a four wheel drive system. More specifically, it has been proposed that front and rear drive shafts serve, respectively, to drive front and rear differentials and that the shafts be powered from the engine through a center or third differential. Such a three differential system clearly permits overspeeding of any one or more of the wheels as a result of rounding corners, or one of the wheels having a small effective radius, and maintains torque to such overrunning wheel. However, there arises a serious drawback in that if one wheel should encounter a slippery or icy patch of ground and lose all traction, it will spin freely and the differentials will cause the other three wheels to exert no driving torque. In other words, loss of traction by one of the four wheels results in the whole vehicle being stalled. Conversely, on braking, the skidding of one wheel likewise would result, in such a three differential arrangement, in a reduction in the over-all braking effect for a given pedal pressure. This is more fully explained below in discussing the braking accomplished in the presently disclosed vehicle.

In attempts to overcome such defects, manually operable locking means have been proposed many years ago for one or more of the three differentials and which were to be engaged to eliminate differential action and positively lock the driven parts together. These are, however, inherently so limited in effectiveness that they have never found any commercial acceptance. They would generally be engaged too late, that is, after the vehicle is already in trouble. If left engaged, they would set up destructive strains. When engaged, there could be no differential action even though such action is necessary to prevent the aforementioned cornering and circumferential tire scrub.

The present invention may be viewed as an improvement in four wheel drives of the genus disclosed and claimed in applicant's copending U. S. application Serial No. 360,128, filed June 8, 1953. It has, therefore, many of the same objectives as that first disclosed invention, viz., to provide what is a real four wheel drive under substantially all operating conditions by eliminating both circumferential and cornering tire scrub, eliminating any need for manual engagement or disengagement of clutches or locks, yet preventing stalling of the vehicle if one or two wheels should spin without traction on a slippery surface, and yielding more positive braking action if a wheel should lock and skid.

In addition to these general objectives, the present invention is particularly concerned with achieving them through the use of simple, reliable, and inexpensive components, specifically one-way overrun devices instead of the two-way overrun devices employed in the system disclosed by the above-mentioned copending application.

Another important object of the invention is to realize such a four wheel drive utilizing one-way overrun devices yet which affords reverse drive of the vehicle without any need to disable them by a manually actuated linkage.

It is a further object to provide such a four wheel drive which includes a multiple ratio speed change and reversing transmission which in no way interferes with the drive action.

Other objects and advantages will become apparent as the following description proceeds, taken in conjunction with the accompanying drawings in which:

Fig. 2 is a vertical, longitudinal section through the transmission and drive components of the vehicle shown in Fig. 1;

Figure 1:
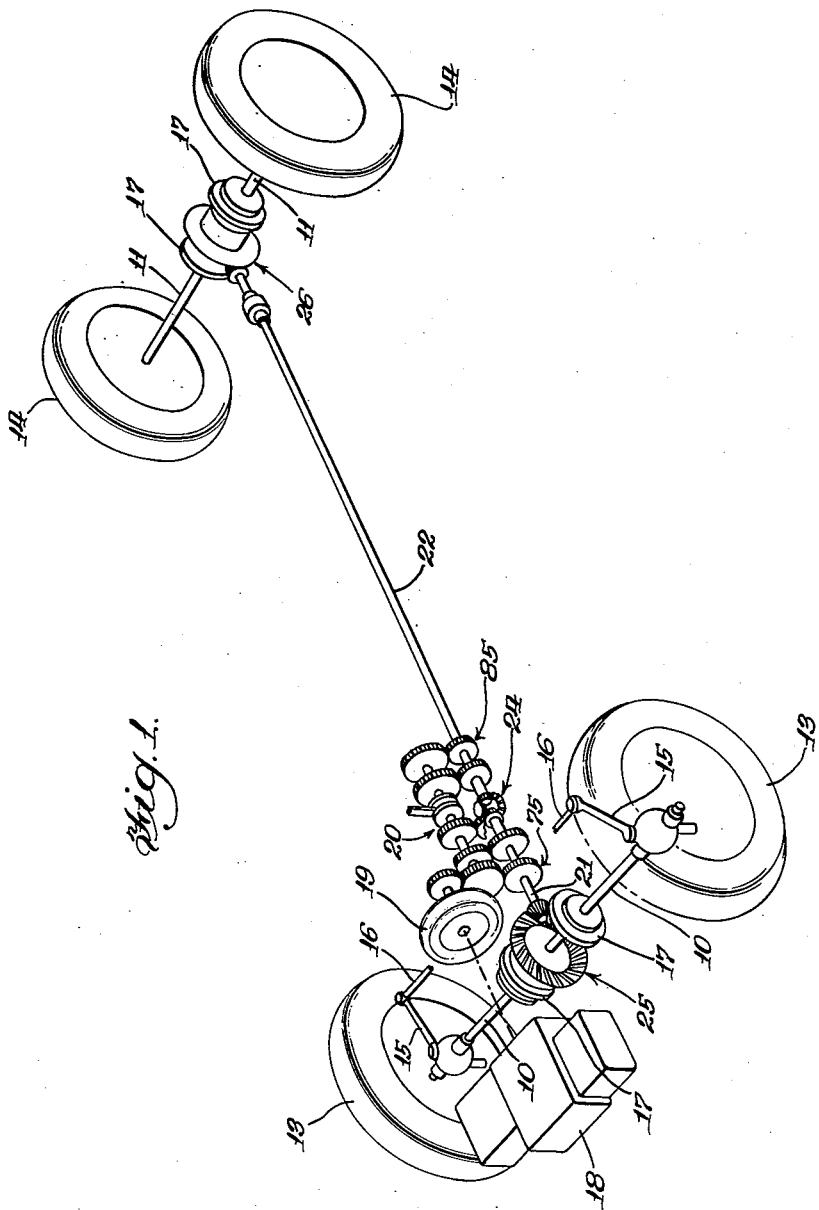
Figure 1 is a perspective view of an automotive vehicle embodying the present four wheel drive, the vehicle being shown "stripped" to its chassis.

Figs. 3 and 4 are detail views taken substantially along the lines 3—3 and 4—4 respectively in Fig. 2 and illustrating reversing gear means not visible in Fig. 2; and Fig. 5 is a sectional view taken substantially along the line 5—5 in Fig. 2 and showing the construction of an exemplary one-way overrun device.

While the invention has been shown and is described in some detail with reference to a particular embodiment thereof, there is no intention that it thus be limited to such detail. On the contrary, it is intended here to cover all modifications, alternative constructions and equivalents falling within the spirit and scope of the invention as defined by the appended claims.

Referring now to Fig. 1, a four wheel drive system of the present invention is there shown in connection with only those parts of an automotive vehicle necessary to make clear the environment of its application. The vehicle in this instance includes front and rear pairs of live half axles 10 and 11 carrying front and rear pairs of traction wheels 13 and 14 equipped with pneumatic tires. The front wheels 13 are pivoted on the outer ends of their axles 10 for Ackerman type steering action under the control of knuckle arms 15 and tie rods 16 extending to a suitable steering mechanism (not shown). Four wheel brakes are provided, that is, means for braking each half axle. In Fig. 1, brake discs 17 are illustrated on each half axle for cooperating with any suitable form of disc-type brake mechanism (not shown). The vehicle has a prime mover or engine 18 which may be of any type and which supplies power through a torque converter 19, a multi-speed and reversing transmission 20, and thence through the present four wheel drive system to both pairs of wheels 13 and 14.

In this four wheel drive system, a center differential 24, adapted to be driven from the transmission 20, serves to drive both front and rear propeller shafts 21 and 22. The propeller shafts, in turn, are connected to the front and rear pairs of axles 10 and 11 through front and rear differentials 25 and 26, respectively. These latter differentials may be of conventional organization, having ring gears driven by pinions on the respective propeller shafts.

Referring now in more detail to Fig. 2, an output shaft 19a of the torque converter 19 carries a pinion 30 which meshes with a mating gear 31 fast on an input shaft 32 for the transmission 20 which is contained within a gear housing 34. Inasmuch as the prime mover 18 always drives the shaft 19a in one rotational direction, it will be apparent that the input shaft 32 is likewise always driven in one rotational direction.

The multi-speed transmission 20 comprises three forward speed gears 35, 36 and 37 which are adapted to be selectively operative to produce "low," "second," and "high" drive ratios. The low gear 35 is rotationally fast on the shaft 32 but slidable axially relative thereto by virtue of a splined connection at 40, while the second and high gears 36 and 37 are held axially fast on the shaft 32 by retainers 41 but journaled for rotation relative thereto by suitable bearing sleeves 42.

In the present instance, the center differential 24 cooperates directly with the multi-speed transmission 20, in that the differential is driven directly from any one of the three gears 35, 36 or 37. As illustrated in Fig. 2, the center differential 24 comprises two terminal elements 45, 46 here embodied as bevel sun gears, and an intermediate element, here shown as a planet carrier 48. The sun gears 45 and 46 are connected directly to the respective propeller shafts 21 and 22 by splined connections at 49 and 50. For powering the center differential 24 from the engine, the planet carrier 48 is formed as three rigidly connected parts and adapted to be rotationally driven from the three gears 35, 36 and 37 in the transmission 20. For this purpose, the planet carrier 48 includes a first portion 48a which is journaled directly on the propeller shaft 22 by a bearing sleeve 51, the portion 48a being rigidly connected by a plurality of bolts 52 to a second portion 48b similarly journaled on the shaft 22 and partly on a cylindrical hub 46a of the sun gear 46. A third carrier portion 48c is journaled partly on the forward propeller shaft 21 by a suitable sleeve bearing at 54, and partly on a cylindrical hub 45a of the sun gear 45. The parts 48b and 48c are made rigid by a splined or keyed connection at 55. These three planet carrier portions, therefore, rotate as a single unit and carry a central stud 56 journaling two planet gears 58, 59 which mesh with both of the sun gears 45 and 46.

The carrier portion 48c is formed with an integral spur gear 60 which meshes with the low gear 35 when the latter is shifted to the right. Drive from the shaft 32 through the low gear 35 and the gear 60 thus produces a low forward speed for the vehicle. The carrier portion 48c additionally has an integral spur gear 61 formed thereon and permanently meshed with the second transmission gear 36, while the carrier portion 48a has an integral gear 62 permanently meshed with the gear 37. The gears 36 and 37 may be locked selectively to the shaft 32 by means of a synchro-mesh clutching element 64 which is shifted to the left or to the right by means of a shifting finger 65 associated with a gear shifting linkage (not shown). The low gear 35 is shifted to the left or right by means of a second gear shifting finger 66 engaged in an annular groove 35a formed in a collar on that gear. The synchro-mesh device 64 is, of course, centrally positioned or neutralized when the low gear 35 is shifted to the right for driving engagement with its mating gear 60.

For reverse drive, any suitable reversing arrangement may be employed. As shown in Figs. 3 and 4, an idler gear 70 which is relatively long axially, is axially slidable and journaled on a supporting shaft 71 paralleling the shaft 32. The idler 70 is formed with a collar 70a having an annular groove 70b which receives a shifting finger 74 of the gear shift mechanism (not shown). With the low gear 35 shifted to the left as viewed in Fig. 2, the idler gear 70 may be shifted to the right as shown by dashed lines in Fig. 4 until it meshes with both the gear 35 and the gear 60 (Fig. 3) so that the planet carrier 48 is driven in a reverse direction.

As explained above, one of the primary difficulties with conventional four wheel drive systems employing center differentials lies in the fact that slippage of but one wheel results in stalling of the entire vehicle. That is, the center differential gives such relative freedom to the front and rear propeller shafts that free spinning of one leaves the other completely stationary with no torque transmitted thereto.

In accordance with the invention, this difficulty is eliminated by the use of a one-way overrun device which is drivingly interposed effectively between one of the propeller shafts (i. e., the center differential terminal element connected to that propeller shaft), and a shaft which is always driven in one rotational direction from the prime mover even if the transmission is shifted to reverse. These respective drive connections are constructed to provide speed change ratios such that under normal driving conditions (i. e., when both the center differential terminal elements rotate in a forward direction at substantially the same speed) the overrunning member of the overrun device turns faster than and slips freely relative to the other member by a predetermined percentage. With this arrangement, the center differential has freedom to "work" in order to afford differences in front and rear wheel speeds which may be necessary to prevent circumferential or cornering tire scrub. However, in the event that a wheel powered by the one propeller shaft slips and spins, the one-way overrun device then automatically engages to lock the center differential and thus cause positive torque transmission to the other propeller shaft. This arrangement permits reverse drive of the vehicle without any manual shifting or disengagement of parts since in reverse drive the overrun device is caused to slip freely.

As illustrated in Fig. 2, a one-way overrun device 75 is employed which includes a driver member 76, a surrounding overrunning member 78, and a plurality of balls or rollers 79. While the overrun device may take any of a variety of known forms, the details of one construction are shown by Fig. 5. As there illustrated, the driver member 76 is cylindrical except for the provision of a plurality of circularly spaced circumferentially extending notches 76a which taper in radial depth. The overrunning member 78 is cup-shaped in form, having a smooth inner cylindrical surface 78a. Disposed between the driver member 76 and the overrunning member 78, and lying within the notches 76a are the balls or rollers 79 which are made of such diameter that they wedge between the driver and overrunning members when in the shallower ends of their respective notches, and slip freely when in the deeper ends of their respective slots. With this arrangement, therefore, the driver member 76 and overrunning member 78 may turn freely relative to one another in a counterclockwise direction (Fig. 5) as long as the latter turns faster than the former. This simply causes the rollers 79 to advance to the deeper ends of the notches 76a where they slip freely. If, however, the overrunning member 78 tends to run more slowly in a counterclockwise direction than the driver element 76, then the rollers 79 are shifted to the shallow ends of the notches 76a and wedge against the cylindrical surface 78a to lock the two members for drive in unison. It will also be observed that in the event that the driver member 76 rotates clockwise, while the overrunning member 78 rotates counterclockwise, then the rollers 79 slip freely to permit relative rotation between the two members. If both members rotate clockwise, they will be locked together if the overrunning member 78 tends to turn faster than the driver member 76.

In the present instance, the driver element 76 is drivingly connected with the terminal element or sun gear 45 of the differential 24, and with the front propeller shaft 21, by virtue of a rigid or keyed connection at 80 to that shaft. The driver member thus rotates in one direction or the other depending upon whether the vehicle is being driven forwardly or in reverse. For drivingly connecting the overrunning member 78 to a part which always turns in the same direction, such member is formed with an integral peripheral gear 78b which is meshed with the gear 31 fast on the input shaft 32. The drive ratio, i. e., relative diameters, and the drive sense of the gears 31 and 78b are chosen such that the overrunning member 78 turns in the same direction (counterclockwise as viewed in Fig. 5) as the driver member 76 and a predetermined percentage faster than such driver member when the transmission 20 is shifted to the "high" speed and the differential 24 drives the two propeller shafts 21 and 22 at the same speed. That predetermined percentage may be in the order of 10 percent in order to permit the front wheels 13 to overspeed the rear wheels without cornering scrub as the vehicle negotiates turns. When the transmisison is shifted to the "second" or "low" speeds, then the overrunning member 78 overspeeds the driver member 76 by a still greater percentage.

With the arrangement described, therefore, it will be understood that the front and rear propeller shafts 21, 22 and the corresponding front and rear pairs of wheels 13, 14, are all positively driven from the prime mover under normal conditions of operation. The one-way overrun device 75 simply slips freely and causes no interference. When the vehicle negotiates turns and the front wheels tend to rotate faster than the rear wheels, the front propeller shaft 21 may exceed the speed of rear shaft 22 up to a certain degree, the differential 24 having freedom for differential action. Front wheel scrub does not occur. However, in the event that a front wheel should lose traction and spin, the one-way overrun device 75 will lock automatically as soon as the front drive shaft 21 exceeds the speed of the overrunning member 78. When this occurs, the terminal element or sun gear 45 is positively geared to the planet carrier 48 through the overrunning member 78, the gear 31, the shaft 32 and one of the pairs of speed change gears, for example, the gears 37 and 62. With the freedom of the differential 24 thus limited, its two terminal elements 45 and 46 are both positively driven from the shaft 32 so that the rear propeller shaft 22 and the rear wheels 14 are positively driven and the vehicle is not completely stalled. It will be understood that when the overrun device 75 locks, the differential 24 will be "working" so that the rear drive shaft 22 will be driven more slowly than the front shaft 21 under these conditions.

Moreover, if when the vehicle is being braked one or both of the rear wheels should lock and skid, then the drive shaft 22 would tend to be stationary, causing the planet carrier 48 to slow down relative to the front drive shaft 21. If that occurred, pedal pressure applied to actuate the rear brakes would produce little or no retarding action. That is, braking torque on the rear propeller shaft would not be transmitted through the center differential 24 if the latter had unlimited freedom for differential action. However, with the present arrangement, if these conditions occur and the planet carrier 48 tends to slow down beyond a predetermined amount relative to the front drive shaft 21, the overrun device 75 automatically engages to limit the free action of the differential 24. Therefore, the front and rear propeller shafts 21 and 22 must both turn so that the braking effort exerted on the rear axle brake discs is transferred through the center differential to the front drive shaft 21 and the front wheels where it is effective in retarding the vehicle. Enhanced and more reliable braking operation is thus afforded.

It will also be observed that the present arrangement aids in preventing the vehicle from rolling rearwardly when parked on an inclined slope with the transmission set in forward gear. If the vehicle tends to roll backwards, both the driver member 76 and the overrunning member 78 would tend to rotate in reverse direction, but the overrunning member tends to rotate faster than the driver member owing to the speed change ratio afforded by the gears 31 and 78b. The result is the same as if the driver member 76 tried to overrun the overrunning member 78 in the forward direction of rotation. This, of course, locks the device 75 so that the drive shaft 21 is connected through the gear 31 to the input shaft 32 and thence through the gear 30 to the engine, the mechanical advantage of this connection being greater than through the speed change gears 35, 36 or 37. As a result, the engine is more effective in preventing backward rolling of the vehicle.

When the transmission 20 is shifted to drive the vehicle in reverse, the planet carrier 48 turns in a reverse direction, thus driving the front propeller shaft 21 and the driver member 76 in a reverse direction. However, the gear 31 turns in the same direction as before, i. e., in the same direction regardless of whether the transmission is shifted for forward or reverse drive, and thus causes the overrunning member 78 to overspeed by an even greater amount the driver member 76. Thus, when the vehicle is reversely driven the overrun device 75 produces no interference whatever. It need not be de-clutched or disengaged by any conscious act on the part of an operator.

The arrangement as thus described would work well enough under many conditions. However, it will not prevent stalling the vehicle in the event that the rear wheels should lose traction and spin freely; nor will it transfer braking torque from the front wheel brakes to the rear wheels when the front wheels lock and skid. In order to bring these operational features about, a second overrun device 85 may be drivingly interposed between the other terminal element of the differential, i. e., the propeller shaft driven by it, and a part which is always driven in the same direction by the vehicle prime mover, the drive connections being such that the overrunning member turns in the same direction as and freely turns a predetermined percentage faster than the driver member when the vehicle is in normal forward travel, i. e., when the two propeller shafts 21, 22 and the planet carrier 48 all turn in a forward direction at substantially the same speed.

As illustrated in Fig. 2, the second overrun device 85 is constructed identically to the device 75, but its driver member 86 is rigidly connected as by splines or keys at 90 to the rear propeller shaft 22. The overrunning member 88 surrounds the driver member and the rollers 89, and is formed with an integral peripheral gear 88b which is permanently meshed with a mating gear 91 keyed as at 91a or otherwise fastened to the aft end of the transmission input shaft 32. The speed change ratio afforded by the gears 91 and 88b is chosen such that when the vehicle is driven forwardly under normal conditions, i. e., with the propeller shafts 21 and 22 turning at substantially the same speed, the overrunning member 88 turns faster than and slips freely relative to the driver member 86. Slight variations in the speed of the rear propeller shaft 22 relative to the front propeller shaft 21, such as may be occasioned by low air pressure of the rear tires, heavy loading and deflection of the rear tires, or greater tread wear on the rear tires, in no way affect the action of the center differential 24 since the driver member 86 and the overrunning member 88 turn freely until the rear propeller shaft overspeeds the front propeller shaft by a predetermined amount. In the event that the rear wheels should lose traction on ice or any slippery surface, then overspeeding of the rear propeller shaft 22 and the driver element 86 relative to the carrier 48 will result in locking of the driver and overrunning members. This, in turn, limits the action of the differential 24 so that the front propeller shaft 21 and the front wheels are, nevertheless, positively driven. Even though the rear wheels lose traction, therefore, the vehicle will not be stalled since power is transmitted to the front traction wheels.

Moreover, if the front wheels should lock and skid when the vehicle is braked, thus causing the front propeller shaft 21 to become substantially stationary and the rear propeller shaft 22 to overspeed relative to the carrier 48, the second overrun device 85 will lock, thereby limiting the action of the center differential 24 and positively transferring braking torque from the front wheel brakes through the front propeller shaft to the rear propeller shaft where it is effective on the rear wheels to retard the vehicle.

The second overrun device 85 also aids, as explained above in connection with the first device 75, in preventing the vehicle from rolling rearwardly on an inclined surface when parked with the transmission 20 shifted to one of its forward speeds.

I claim:

1. In a vehicle having a prime mover, two front wheels, and two rear wheels, a four wheel drive comprising, in combination, front and rear differentials drivingly interposed respectively between the front and rear wheels, front and rear propeller shafts connected respectively to drive said front and rear differentials, a center differential drivingly interposed between said propeller shafts, a speed-change and reversing transmission connected to drive said center differential and having an input shaft driven in one direction from the prime mover, a one-way overrun device including a driver member and an overrunning member, means connecting said driver member to one of said propeller shafts, and gearing drivingly connecting said input shaft to said overrunning member so that the latter always rotates in the direction of rotation of said driver member when the vehicle is driven forwardly, said gearing having a drive ratio and sense causing said overrunning member to slip freely at a speed greater by a predetermined percentage than the speed of said driver member when said transmission is set to its highest forward speed.

2. In a vehicle having a prime mover and front and rear pairs of wheels, a four wheel drive comprising, in combination, front and rear differentials drivingly interposed between respective ones of the front and rear pairs of wheels, front and rear propeller shafts connected respectively to drive said front and rear differentials, a center differential drivingly interposed between said front and rear propeller shafts, means connecting said center differential to be driven optionally in forward and reverse directions from the prime mover, a part connected to be driven in one direction of rotation from the prime mover, a one-way overrun device including a driver member and an overrunning member, means for connecting said driver member to rotate with one of said propeller shafts, means for driving said overrunning member from said part, said last-named means including gearing having a drive ratio and sense making said overrunning member turn freely in the same direction as and at a predetermined percentage faster than said driver member when said center differential is driven in a forward direction and said propeller shafts turn at the same speed, whereby overspeed of said one propeller shaft relative to the other beyond a predetermined amount limits further action of said center differential, and in reverse drive said overrun device slips freely.

3. For use on a vehicle having front and rear pairs of wheels and a prime mover, a four wheel drive comprising, in combination, an input shaft driven in one direction by said prime mover, a differential having first and second terminal elements and an intermediate element, means for optionally driving said intermediate element in forward and reverse directions from said input shaft, means for drivingly connecting said first and second terminal elements to the front and rear pairs of wheels, respectively, a one-way overrun device having a driver member and an overrunning member, means for drivingly connecting said driver member to one of said first and second terminal elements, and means drivingly connecting said overrunning member with said input shaft to make such member rotate in the same direction as and overrun a predetermined percentage faster than said driver member when said intermediate element turns in a forward direction at the same speed as said one terminal element.

4. In a four wheel drive for a vehicle having a prime mover and two oppositely extending propeller shafts, the combination of a first member rotationally driven in one direction from the prime mover, a differential having two terminal elements adapted respectively to drive the two propeller shafts and having an intermediate element, means for driving said intermediate element optionally in forward and reverse directions from the prime mover so that the vehicle is propelled either forwardly or reversely, a one-way overrun device having a driver member and an overrunning member, and means connecting said overrun device between one of said terminal elements and said first member, said last-named means including means to rotate said overrunning member in the same direction as and a predetermined percentage faster than said driver element when said intermediate element is driven in a forward direction at the same speed as said one terminal element.

5. In a four wheel drive vehicle having a prime mover, the combination of two propeller shafts, a differential including two terminal elements and an intermediate element, means for driving said two propeller shafts from respective ones of said terminal elements, means for optionally driving said intermediate element in forward and reverse directions from the prime mover, a one-way overrun device having a driver member and an overrunning member, a shaft driven in the same direction by the prime mover regardless of the direction of drive of said intermediate element, and means drivingly interconnecting said one-way overrun device between one of said terminal elements and said shaft, said last-named means including means for making said overrun device slip freely except when said one terminal element overspeeds said intermediate element by a predetermined amount when the latter is driven in a forward direction.

6. In an automotive vehicle having a prime mover and a first and second pairs of wheels, a four wheel drive comprising, in combination, a differential having first and second terminal elements and an intermediate element, means drivingly connecting said terminal elements respectively to said first and second pairs of wheels, means for optionally driving said intermediate element in opposite directions from the prime mover to run the vehicle forwardly or reversely, a shaft driven in one direction only from the prime mover, first and second one-way overrun devices each including a driver member and an overrunning member, means effectively connecting the first and second driver members respectively to said first and second terminal elements, means effectively connecting the first and second overrunning members to said shaft, said last-named means including means for causing said overrunning members to rotate in the same direction as their respective driver members and overspeed freely by predetermined percentages such driver members when the vehicle is being driven forwardly with said terminal elements rotating at substantially equal speeds.

7. In an automotive vehicle having a prime mover and first and second pairs of wheels, a four wheel drive comprising, in combination, front and rear differentials drivingly interposed respectively between said front and rear wheels, front and rear propeller shafts drivingly connected respectively to said front and rear differentials, a center differential having first and second terminal elements and an intermediate element, means drivingly connecting said terminal elements respectively to said front and rear propeller shafts, means for optionally driving said intermediate element in opposite directions from the prime mover to run the vehicle forwardly or reversely, a shaft driven in one direction only from the prime mover, first and second one-way overrun devices each including a driver member and an overrunning member, means effectively drivingly connecting the first and second driver members respectively to said front and rear propeller shafts, means effectively drivingly connecting the first and second overrunning members to said shaft, said last-named means including means for causing said overrunning members to rotate in the same direction as their respective driver members and overspeed freely by predetermined percentages such driver elements when the vehicle is being driven forwardly with said propeller shafts turning at substantially equal speeds.

References Cited in the file of this patent

UNITED STATES PATENTS

| | | |
|---|---|---|
| 1,938,457 | McCaffery | Dec. 5, 1933 |
| 2,206,907 | Loughridge | July 9, 1940 |
| 2,667,087 | Myers | Jan. 26, 1954 |
| 2,711,222 | Bock | June 21, 1955 |

FOREIGN PATENTS

| | | |
|---|---|---|
| 899,607 | France | Aug. 28, 1944 |